Figure 1:
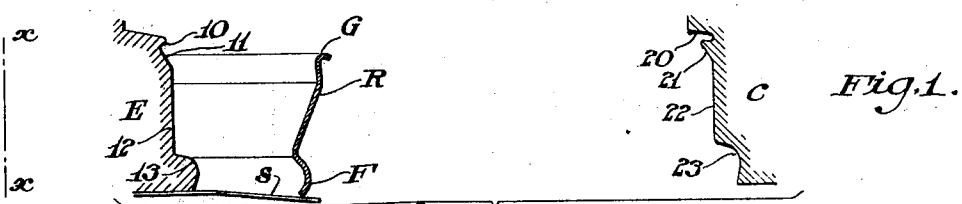
Figure 2:
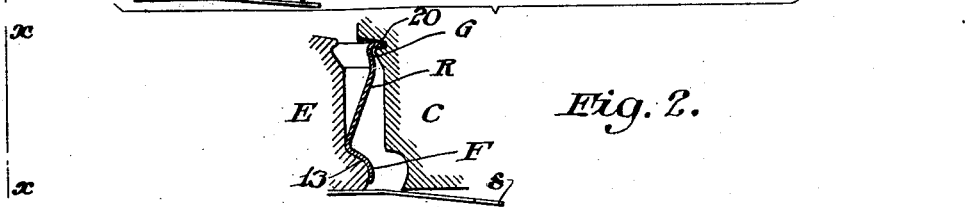
Figure 3:
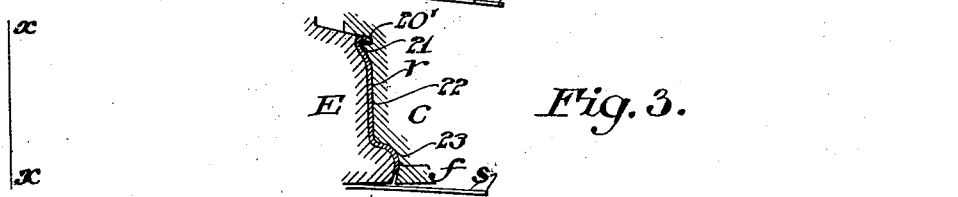

Dec. 29, 1931.  G. A. VIS  1,838,892

METHOD AND MACHINE FOR FORMING RINGS

Filed March 15, 1927  4 Sheets-Sheet 1

INVENTOR.
George A. Vis,
BY
John P. Tarbox
ATTORNEY.

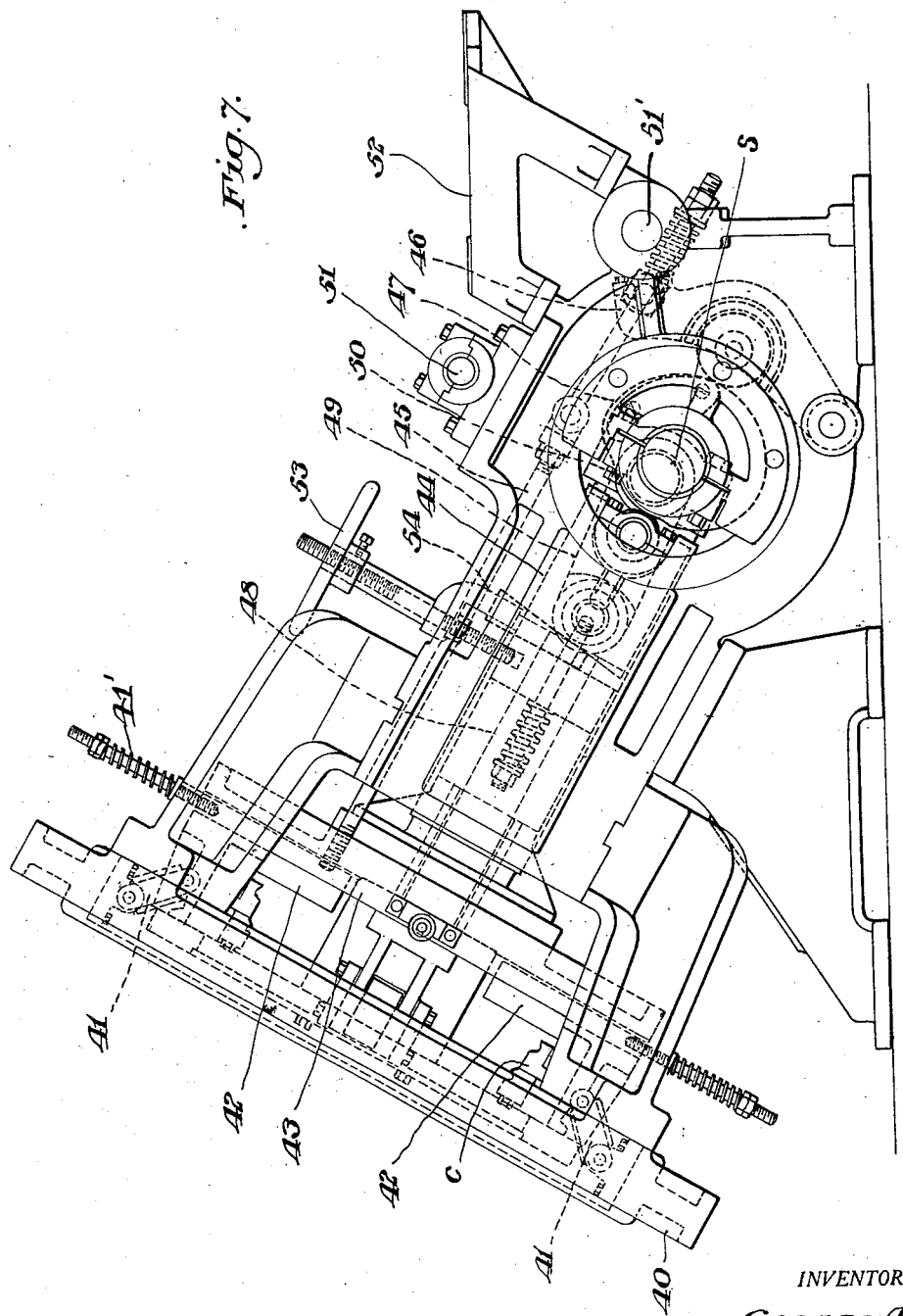

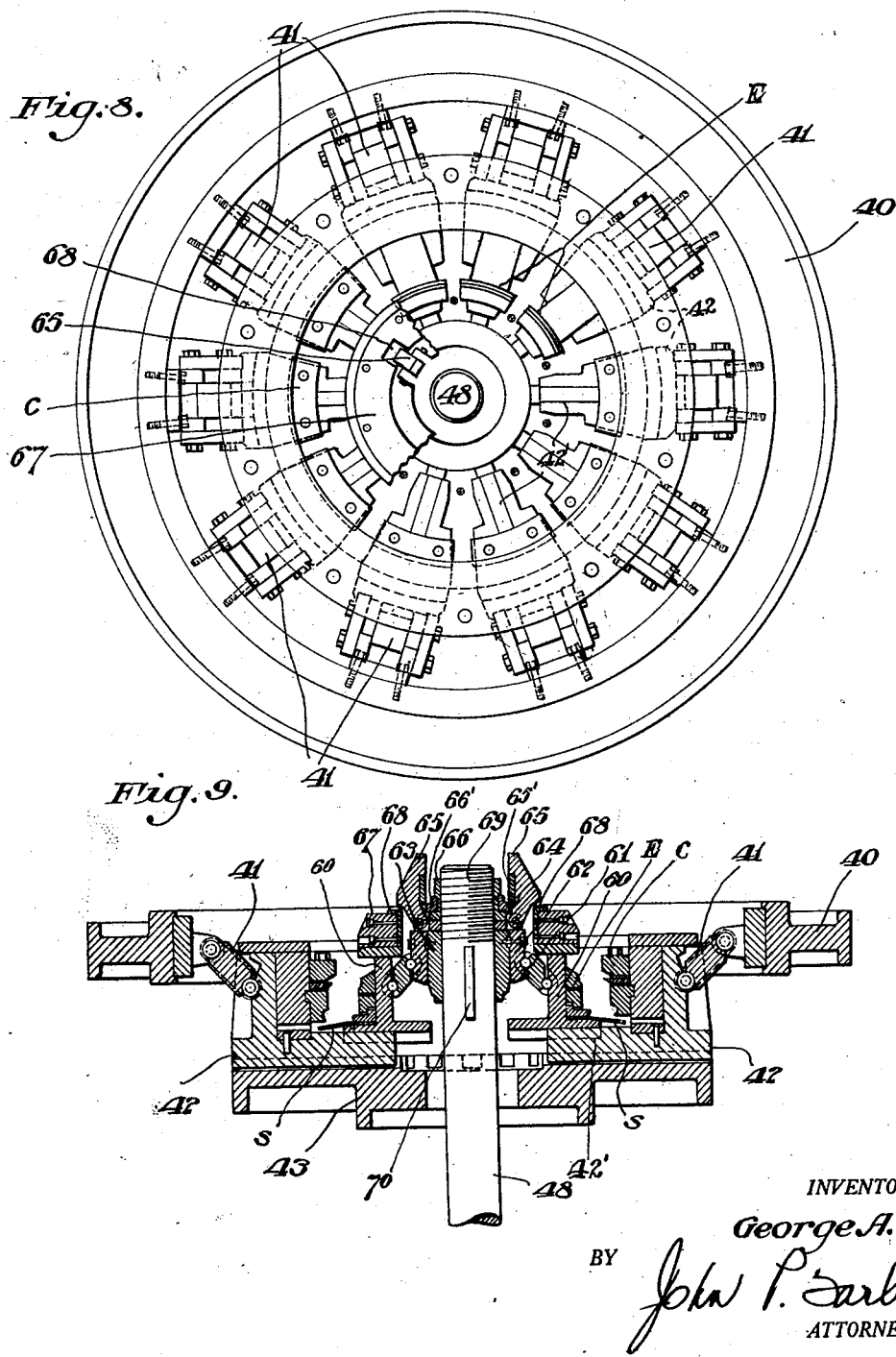

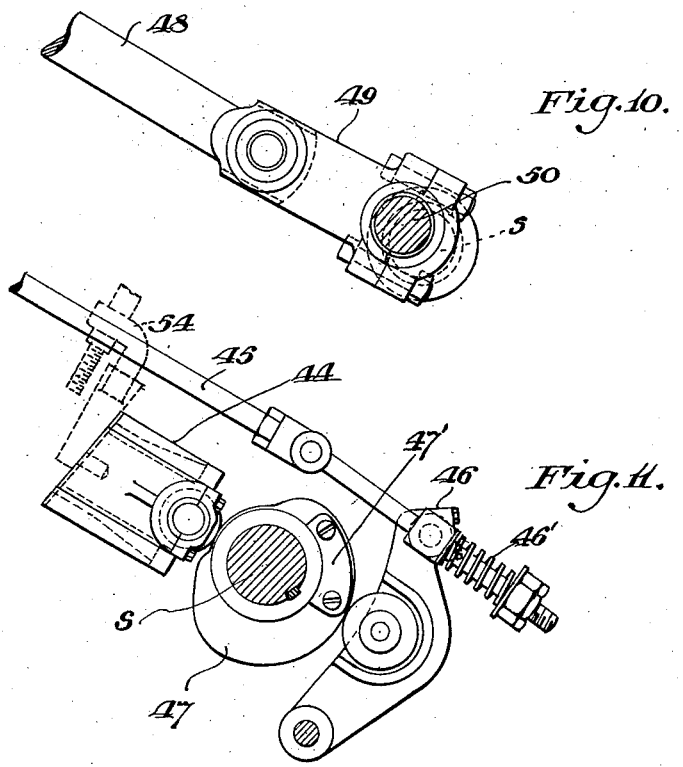
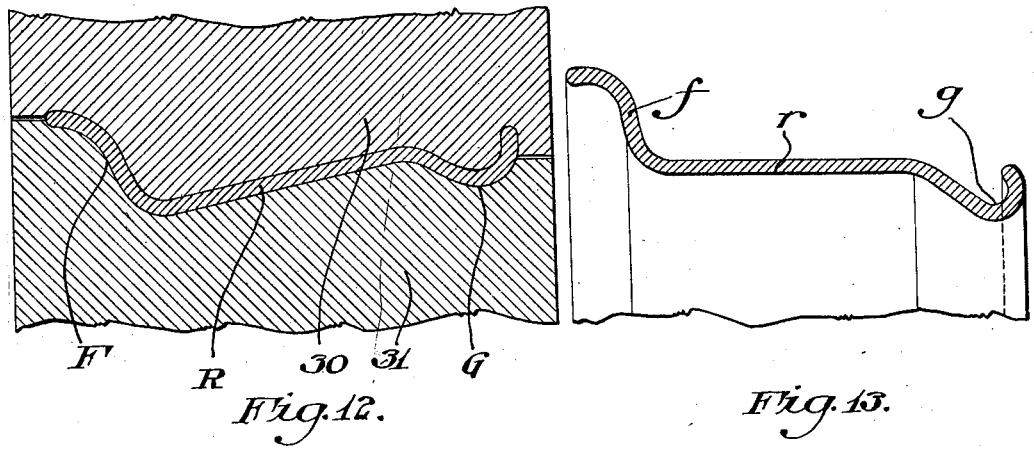

Patented Dec. 29, 1931

1,838,892

UNITED STATES PATENT OFFICE

GEORGE A. VIS, OF DETROIT, MICHIGAN, ASSIGNOR TO BUDD WHEEL COMPANY, OF PHILADELPHIA, PENNSYLVANIA, A CORPORATION OF PENNSYLVANIA

METHOD AND MACHINE FOR FORMING RINGS

Application filed March 15, 1927. Serial No. 175,482.

The present invention comprises a method of forming rings of irregular cross-section and the apparatus for performing that method. Although the following description is specifically concerned with but one form of such rings, namely a so-called "quick detachable" rim for the mounting of a pneumatic type vehicle tire, the invention is obviously capable of much broader use and interpretation.

The provision of such a method and of the apparatus for carrying it out are the main objects of the invention. More specifically, it is an object of the invention to provide a method whereby a ring is given its ultimate form and size in one operation.

Another object of the invention is to provide a single machine wherein a plurality of process steps, heretofore carried out in separate machines, are combined. The provision of novel details of such a machine comprise still other objects of the invention.

The saving in time and economy of operation are the outstanding advantages resulting from the use of the invention.

The usual practice of manufacturers of tire rims has been, and still is, to use four separate machines and process steps in finishing a rough rim that has been previously prepared by the successive steps of bending, butt welding and trimming. The said four machines may be of the well-known types shown in patents to Charles G. Grotnes, Numbers 1,284,093, 1,456,734 and 1,407,148 issued November 5 1918, May 29th 1923 and February 21, 1922, and entitled "Rolling machine", "Expanding machine" and "Forming machine" respectively. The above machines are used successively in the operations of rolling (which usually requires two machines, each carrying out part of the work of forming) expanding to an oversize and contracting to final size. The necessity of these steps arises from the use of commercial shapes which require a final rectification; and from the impossibility of obtaining the exact size of ring desired by means of the ordinary processes of manufacture. Accuracy in the final product therefore demands a forming step or steps to give to the product the correct cross-section; a stretching, or expanding step to overcome the elasticity of the metal and bring the rim to a slight oversize, and a contracting or shrinking operation to effect the final reduction to exact size.

The present invention combines the structure of an expanding and a contracting machine, and, by the use of special dies, accomplishes, in the combined machine, the final forming of the ring as well as the necessary expanding and contracting steps.

Figure 4:
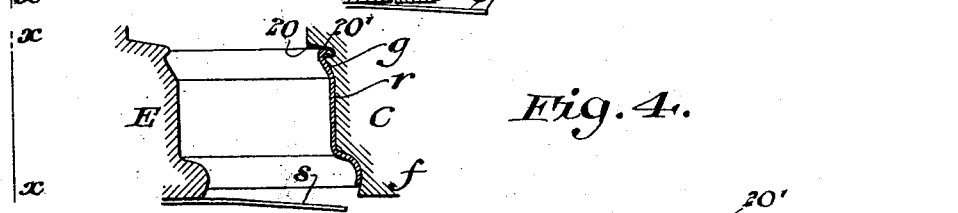
Figure 5:
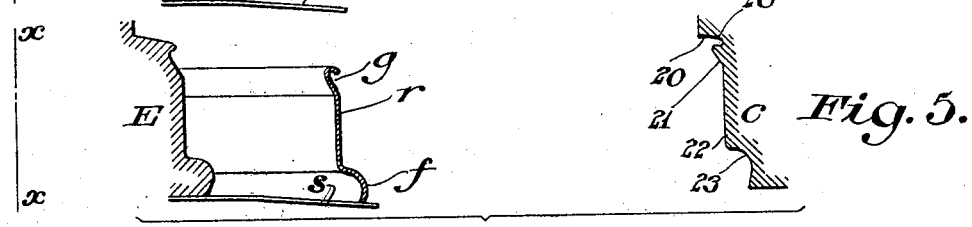
Figure 6:
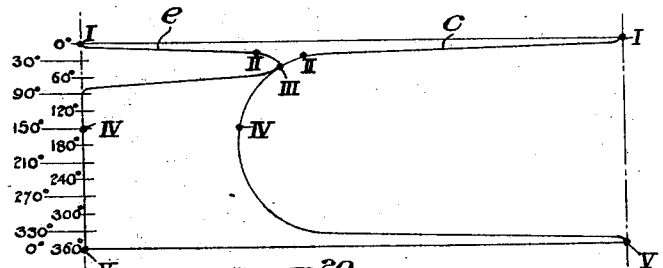

The drawings which are attached hereto, and which form a part of the specification, illustrate an embodiment of the invention adapted to form a specific type of automotive tire rim, and comprise:

Figures 1 to 5, successive views of the forming dies, showing their operation upon a rim. The horizontal scale representing displacement of the dies of this figure is greatly exaggerated with respect to the vertical scale, so as to show the action more clearly;

Figure 6, a pair of curves, to the same horizontal scale as Figures 1 to 5, showing the movement of the dies referred to the rotation of the machine crankshaft;

Figure 7, a side view of the complete machine;

Figure 8, a front view of the working head of the machine, looking in the direction of the axis of the dies, with some parts removed;

Figure 9, a central section of Figure 8,

Figure 10, a view of the expander die operating mechanism;

Figure 11, a view of the contractor die operating mechanism;

Figure 12, a section of the stock, as rolled commercially, and of a portion of the rolls used; and Figure 13, a section of the finished rim, Figures 12 and 13 being drawn to an enlarged scale.

Figure 14:
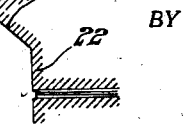

Figure 14, an enlarged partial section of the contracter die showing certain details of its shape.

Similar numerals, in the different figures, refer to identical elements of the structure.

In the commercial formation of bar stock to be used in making automobile rims such as are adapted to supporting pneumatic tires, it has been found most economical and satisfactory in general to use rolls 30, 31 as shown in Figure 12, which produce a strip substantially similar to the finished article in cross section, but requiring minor adjustments of such parts as the flange F and the gutter G to make the rough stock suitable for use in the finished article, which is shown fragmentarily in Figure 13. Therein flange $f$ has been bent up to substantially a right angle with the rim base $r$ and its curved portion slightly re-shaped, while the gutter $g$ has been curled up to make a shorter bend and shaped to make a more acute angle with the rim base $r$. It is this formation, which has heretofore been done by two rolling operations; and the sizing of the rim, which has heretofore been done by expanding and contracting the same, that the present invention accomplishes in one machine.

Referring to the first six figures of the drawings, the manner in which the operations of expanding, forming and contracting a partly formed tire rim are accomplished in one machine is clearly shown. Figures 1 to 5 are drawn with reference to the axis X—X shown at the extreme left of said figures, which axis represents the common center of the two circular die forms produced by the two groups of expander and contractor dies respectively.

Movements to the right, therefore, in Figures 1 to 6, represent movement outward from the axis X—X of the machine, while movements to the left indicate inward movements with respect to the machine. The dies E and C shown sectionally in these views are representative of one of the several dies which together comprise these two groups.

Figure 6, by means of two curves labeled respectively $e$ and $c$, shows graphically the relative movements of the above two sets of dies. Thus it is seen that both dies start from the most widely separated point I at 0°, or the beginning of a cycle of operations. Upon rotation of the operating shaft of the machine the expander dies E begin to move outward and the contractor dies C to move inward. At a point III there is a slight "dwell" in the inward movement of the contractor dies C, at which point the expander dies have reached their maximum outward movement, as shown by curve $e$. Following this, the expander dies rapidly fall back to their innermost position while the contractor dies continue a relatively slow inward movement to a minimum radius at a point labeled IV on the curve $c$. Thereafter the contractor dies retreat outwardly from the center leaving the formed ring free for removal from the machine.

Having thus explained the sequence of movement of the dies as shown in Figure 6, the first five figures picture the results of this operation on a rough ring. The ring, designated generally by R, is in the present case a rim of a well known form adapted to carry a pneumatic tire and comprises a side flange F joined to a cylindrical base portion at one side and a "gutter" or channel G at the other side of said portion in which a split, removable side ring or flange similar in shape to the finished flange $f$ (Fig. 13) is adapted to seat. As shown in Figure 1, the roughly formed ring R is of substantially cylindrical contour although the cylindrical middle section is shown as slightly conical in shape. The assumption of a slight conical form by the roughly-bent rim is due to the fact that its axis of least bending strength or "neutral axis" does not lie in the plane of the straight body portion of the rim R, but at an angle thereto, because of the unsymmetrical relation of the flange F and the gutter G to the said body of the rim. The position of the dies in this figure is the loading position corresponding to the points I—I on the curves $e$ and $c$ of Figure 6. Upon movement of the dies to the position of Figure 2 which corresponds to the points II—II of Figure 6 the flange F of the rim, which has been supported upon a spring leaf $s$ attached to the die E, is lifted upwards upon the rounded portion 13 of the die E, and with the adjacent portions of the rim base, is gradually stretched, while the edge of the gutter G has been pushed upwards against the surface 20 of the die C. As the dies E and C continue their mutual approaching movements the lip of the gutter G slides over the adjoining slanting faces 20, 20' (shown more clearly on an enlarged scale in Fig. 14) of the contractor die C, thus initiating an increased bending or curling up of the gutter G. The relative motion of the two dies E and C at this point is compounded of the outward movement of E and the inward movement of C. Further approach of the dies brings the projecting ridge 21 against the inside of the gutter G of the rim, pressing it inward against the corresponding portion 11 of the expander die E. At a point corresponding to the point III on the curves $e$ and $c$ of Figure 6, the dies E and C have come together upon the rim which is now in its finished state designated by $r$ at this, and succeeding points. The slight "dwell" in the inward movement of the contractor die C, which has been remarked above, occurs while the work of completing the formation of the rim is done by the expander dies in their outward movement at this time. (The "dwell" at point III on the curves is so slight, of a few degrees duration only, as to be unnoticeable on the scale to which the curves are drawn.) During this nearer approach of the dies E and C their action upon the rim R approaches that of die pressing rather than their previous bending and stretching action. This die pressing action results in a final shaping or justification of the flange, now entitled *f*, bring it up more nearly at right angles to the body *r* of the rim and at the same time bending up the gutter bodily so as to make it assume a more acute angle, as shown by *g*, to the body of the rim than heretofore. In this final pressing operation the surfaces 10 and 11 of die E cooperate with surfaces of 20, 21 of die C in shaping the gutter *g*; surfaces 12 and 22 of dies E, C, respectively, cooperate and insure straightness of the body of the rim *r*; while surfaces 13 and 23 cooperate to shape the flange *f*. In Figure 4 the expander dies E have returned to their original position leaving the completely formed rim supported on the faces of the contractor dies C which continue to move inwardly at a relatively slow pace, thus contacting the rim to a diameter which is the final size of the rim, less the amount which the rim will expand upon release. The positions of the dies in this view correspond to the points IV—IV in Figure 6. Upon retreat of the die C to its original outward position as shown in Figure 5 the finished rim falls on the spring support *s* and is ready to be removed from the machine.

The structure of the improved machine in which the novel dies are carried and operated according to the above described method corresponds in a great many respects to the machines of Patent Nos. 1,456,734 and 1,407,148 mentioned above.

As shown in Figure 7, the external appearance of the machine is very like that of the latter patent and the blocks 42 which carry the contractor dies C are operated in the same way by means of an adjustable reciprocating member 44 which bears at its upper end a table 43 on which the blocks 42 slide in radial grooves, being operated in and out by means of toggle levers 41 similar in every respect to those of the above mentioned Patent No. 1,407,148. A novel and highly dissimilar structure however, is provided to operate the expander dies of the new machine. The expander dies E are carried on suitable blocks 60 similar to the previously described blocks 42 but differing from those of the above mentioned Patent No. 1,456,734 in that they have bearing, not upon the supporting table directly, but upon an inward, grooved extension 42′ of the die supporting block 42. Toggle levers 61 connect these blocks 60 to a collar 62, which is fastened to another concentric collar 63, the latter having a bearing upon an operating shaft 48, which permits a relative sliding motion longitudinally but is keyed as at 70 to prevent relative rotation. Due to the necessity of providing for adjustment of the travel of the expander dies a lost-motion connection is provided between the operating shaft 48 and the collar 63 which operates the toggle levers 61. This lost motion operating connection is in the form of two pivoted dogs 65 which are pivoted on the first mentioned collar 62 and which have contact pieces 65′ adapted to overhang cooperating pieces 66′ carried on ring 66. These cooperating contact pieces 65′ and 66′ are made of suitable hard material to withstand the wear of operation. The ring 66 is adjustably carried on the operating shaft 48 by means of a threaded connection at 69, thus providing for adjustment of the ring 66 relative to the said operating shaft. A larger ring 67 of rigid construction is carried above the members 60 which bear the expander dies E and is spaced from the table 43 to which it is bolted, by means of distance pieces or spacers (not shown) of the proper length to permit free movement of both of the sliding die bearing members 42, 60 thereunder. Upon this ring 67 are provided contact surfaces 68 which engage with the outer surfaces of the pivoted dogs 65, permitting their disengagement at a selected point on the outward stroke of the shaft 48 and similarly, ensuring re-engagement of the dogs 65 with the ring 66 on the inward stroke of the shaft 48. By means of this construction it is apparent that various degrees of movement of the dies E are permitted at the same time allowing the normal stroke of the shaft 48, which is constant, to be unhampered.

As shown in Figures 7, 10 and 11, the central operating shaft 48 is moved from a crank shaft S through the agency of the crank 50 and connecting rod 49. The table 43 is moved by means of cams 47 placed on either side of the crank 50 on the shaft S. The cams 47 engage suitable rollers carried on a cross head 44 which is adapted to engage a second sliding member through a wedge adjusting member 54 similar to that shown in the aforesaid Patent No. 1,407,148, thus providing an adjustable operating connection for the contractor die mechanism. The operating shaft 48 passes through a central cavity in the said cross head 44, wedge 54 and its cooperating slide. In order to effect return of the table 43, should the force of gravity be insufficient to cause such return, auxiliary cams 47′ are attached to the operating cams 47. The said auxilliary cams 47′ engage suitable rollers on a pair of pull back levers 46 which are connected through a pivoted connecting link with a pair of pull back rods 45 which are attached to the under side of the table 43. A spring 46′ furnishes a resilient connection between the said connecting rod and the lever 46 thus providing a safety feature in case of jamming of the table 43 or its attached parts.

The crank shaft S by means of which both sets of dies are operated is driven as in the aforesaid patents by a train of gears (not shown) whose shafts are carried in bearings 51, 51′. A platform 52 is provided on the machine to support an electric motor or a counter-shaft for the application of power to the machine.

The remainder of the machine is very fully described in the aforesaid Patent No. 1,407,148. For example, the ring 40, which provides an abutment for the various toggle links 41 of the contracting die mechanism, is supported from the frame of the machine by a structure exactly similar to that of said patent. Also the hand wheel 53 is provided to adjust the movement of the contracting die mechanism as in the above patent. A feature not shown therein, however, is a series of springs 41' which press against the table 43 and are connected to the die bearers 42 through a threaded bolt connection, thus providing means for taking up lost motion in the operating mechanism of said die bearing blocks and for preventing undesirable downward movements of those blocks, which are above the center half of the machine, due to their weight. For convenience of manufacture and adjustment, the dies E and C are made sectional, the component parts thereof being divided by shims, as shown in Fig. 9.

By practicing the new method provided by this invention it is apparent that a single machine is enabled to replace the three previously used for the same purpose, performing the same work with the same efficiency as heretofore but with much greater economy.

What I claim is:—

1. The method of making formed rings comprising stretching a ring as a whole beyond its desired size, forming said ring in the stretching operation and contracting it as a whole to its final radial dimension subsequent to forming it.

2. The method of making formed rings comprising expanding a ring as a whole beyond its desired size, forming said ring to its final axial dimension while under tension and finally contracting it as a whole to the desired size.

3. Apparatus for making formed rings comprising a group of dies movable radially inward toward a common center, another group of dies movable radially outward from said center, said groups of dies having their opposed faces shaped to conform substantially to the desired form of the ring, and means for moving and timing the movements of said dies to cause them to stretch the ring by the outward movement of one group of dies, to form it by the relative approach of both groups of dies, and finally, to size it by the inward movement of the other group of dies.

4. Apparatus for forming rings comprising a group of movable dies, a second group of dies movable thereover, and a common means for moving both groups of said dies in opposite directions, including means for moving the dies toward each other, arresting the outer dies as the inner dies reach their maximum outer position and continuing the movement of the outer dies to a predetermined position, coincidently with a more rapid reverse movement of the inner dies.

5. An apparatus for forming complete rims having gutters comprising an inner group of movable dies, an outer group of movable dies, means for moving said groups in opposite directions toward each other, the working faces of the inner group conforming with the cross section of the finished rim exclusive of the completed gutter, the working faces of the outer dies conforming to the cross section of the finished rim exclusive of the completed gutter, and means carried by the outer dies to form the completed gutter.

6. The method of forming and sizing rings comprising the approach of the outer and inner faces of the ring by radially movable outer and inner forming dies to give the ring the desired form, the quick retraction of the inner forming dies after forming, and the subsequent continued inward movement of the outer forming dies to size the ring.

7. The method of forming and sizing rings comprising the approach of the outer and inner faces of the ring by radially movable outer and inner sets of forming dies to give the ring the desired form, the brief stoppage of the approach movement of the outer set of dies during forming, the quick retraction of the inner set of dies from the forming positions, and the subsequent continued approach of the outer set of dies to size the ring.

8. Apparatus for forming and sizing rings comprising outer and inner sets of radially movable forming dies, means for aproaching the said sets of dies to form the ring, means for quickly retracting the inner set after forming, and means for continuing the inward movement of the outer dies after forming to size the ring.

9. Apparatus for forming and sizing rings comprising outer and inner sets of radially movable dies shaped to the form of the ring desired, means for simultaneously approaching the sets of dies to form the ring, means for causing said outer set of dies to dwell at the final forming position, and means for rapidly retracting the inner set of dies from said position and for continuing the inward movement of the outer set of dies after the dwell to size the rings.

In testimony whereof he hereunto affixes his signature.

GEORGE A. VIS.